United States Patent [19]

Tanaka et al.

[11] Patent Number: 5,752,785
[45] Date of Patent: May 19, 1998

[54] DRAINAGE PUMP STATION AND DRAINAGE OPERATION METHOD FOR DRAINAGE PUMP STATION

[75] Inventors: Sadashi Tanaka, Ibaraki-ken; Seiji Miura, Hitachi; Kunio Takada, Ibaraki-ken; Masayuki Yamada, Tsuchiura; Yutaka Shimada; Akira Manabe, both of Ibaraki-ken, all of Japan

[73] Assignee: Hitachi, Ltd., Tokyo, Japan

[21] Appl. No.: 527,898

[22] Filed: Sep. 14, 1995

[30] Foreign Application Priority Data

Sep. 14, 1994 [JP] Japan ................................. 6-219821

[51] Int. Cl.⁶ ................................................ F02B 11/00
[52] U.S. Cl. ................................. 405/52; 405/36; 405/37; 405/80; 137/236.1; 210/170
[58] Field of Search .......................... 405/52, 53, 36–37, 405/80, 93, 45, 92; 137/236.1; 210/170

[56] References Cited

U.S. PATENT DOCUMENTS

| 4,036,023 | 7/1977 | Matsumoto et al. ............... 405/92 |
| 4,332,507 | 6/1982 | Wakamori et al. ............... 405/92 |
| 5,160,216 | 11/1992 | Takada et al. . |
| 5,228,802 | 7/1993 | Kuwabara et al. ............... 405/52 X |
| 5,287,875 | 2/1994 | Otani . |
| 5,360,290 | 11/1994 | Yamada et al. . |
| 5,487,621 | 1/1996 | Takada et al. ............... 405/37 X |

FOREIGN PATENT DOCUMENTS

| 62-786 | 1/1987 | Japan . |
| 63-60100 | 4/1988 | Japan . |
| 6-31636 | 4/1994 | Japan . |

OTHER PUBLICATIONS

Article entitled "Deep Underground Water Drainage Channel Water Drainage Pump System", *Turbo Machines*, vol. 21, No. 10, pp. 23–29 Oct. 1993.

*Primary Examiner*—Tamara L. Graysay
*Assistant Examiner*—Frederick L. Lagman
*Attorney, Agent, or Firm*—Evenson, McKeown, Edwards & Lenahan, P.L.L.C.

[57] ABSTRACT

In a drainage pump station, a driving machine has a capacity greater than a shaft power necessary for no-discharge operation of a pump, and during severe flooding the pump is operated at an overload exceeding its design capacity. During maintenance operation water is fed from a river on the delivery side of the pump station into the station. When an inflow of rainwater into the pump station is great the pump is operated at the necessary capacity, when it becomes small the water level is kept above a rated value, and when the inflow rate is zero the pump discharge is increased to a capacity at which sediment can be discharged. A suction blower is disposed at the top of a suction sump and interstage valves are disposed in entrances of vertical shafts to effect efficient ventilation of the underground waterway. A feed channel is operated as a pressure channel and the pump is of variable capacity and the water level in the underground waterway is controlled to be constant.

20 Claims, 9 Drawing Sheets

DRAINAGE PUMP STATION AND DRAINAGE OPERATION METHOD FOR DRAINAGE PUMP STATION

BACKGROUND OF THE INVENTION

This invention relates to a drainage pump station for draining rainwater and a drainage operation method for a drainage pump station, and is particularly suitable for application to a city drainage pump station wherein a drainage pump is disposed deep underground.

Pumping equipment of rainwater drainage pump stations is designed to be capable of draining even flooding caused by heavy rain of a kind which falls only once in several decades. However, due to increased rates of pavement and provision of drainage gutters in urban areas, for the same amount of rainfall the inflow of rainwater into drainage stations has come to be concentrated into a shorter period. Also, as a result of increases in the density of energy consumed in urban areas causing 'heat island' phenomena, the frequency of occurrence of record heavy rainfall has also been increasing. In drainage stations being newly built, design drainage discharge of stations are being made greater than in the past in order to prevent flooding of drainage basins; however, in existing stations, countermeasures to deal with the above-mentioned sudden flooding accompanying urbanization are needed.

As a measure to deal with this sudden flooding, to drain water as quickly as possible when it rains, full-speed standby operation, wherein a pump is operated at full speed from before rainwater flows into the drainage station, has been being conducted. However, even with full-speed standby operation, in a case of record heavy rainfall exceeding the rainfall of the design capacity of the station, there is still a danger of the drainage station being inundated.

Because this kind of rainwater drainage pump station is not operated constantly it is necessary to check the operation of the pump and other equipment regularly, and for this reason maintenance operation simulating drainage operation has been carried out periodically. However, because rainwater drainage pump stations usually completely drain remaining water from feed channels and suction sumps, the above-mentioned maintenance operation is carried out in a dry-running state with no water being passed through the pump. Consequently, not only is it impossible to check the functioning of the pump and a driving machine in an actually loaded state, but also because bearing parts and shaft seal parts of the pump become dry it is necessary to take measures to supply water to ceramic bearings and ceramic shaft seals, which with the object of simplification of maintenance have recently been coming into wide use.

As conventional methods for conducting maintenance operation with a drainage pump in a loaded state, there has been a method wherein during maintenance operation water for maintenance operation is taken from a river and operation under an actual load is conducted, as mentioned in Japanese Laid-Open Utility Model Publication No. S.62-786, and a method wherein a small amount of rainwater is left in a suction sump and no-discharge operation is conducted, as mentioned in Japanese Patent Publication No. H.6-31636. However, because with these conventional methods the size of the load is limited, operation checking at a maximum anticipated load has been difficult.

In and around cities there is a tendency for drainage stations to be built underground to make effective use of land. On the other hand, since rainwater picks up sediment as it flows along roads and drainage gutters, in conventional drainage stations, to protect the pump, a settling basin of ample capacity has been provided immediately in front of the pump whereby the inflow speed is reduced and sediment is caused to settle and accumulate in the settling basin. However, in an underground drainage station, because the construction work becomes large-scale and also because removing the accumulated sediment is very troublesome, downstream settling basin systems wherein a settling basin is disposed above ground on the pump delivery side have been considered. In this kind of drainage station there are problems such as that sediment accumulates at corners in the suction sump and the capacity of the suction pump is reduced and accumulated sediment intermittently breaks away and is sucked into the pump and reduces the strength reliability of the impeller. Also, when intervals between rainwater drainage operations become long, accumulated sludge produces malodorous air and toxic gases and spoils the environment, and this has been a hindrance to periodic inspections of the underground waterways and the like.

As conventional technology for removing accumulated sediment, providing steps for collecting sediment at the bottom of an inflow basin has also been considered. However, with this idea also, because it is necessary to periodically remove the collected sediment, practical application to an underground drainage station is difficult.

As mentioned in Japanese Laid-Open Utility Model Publication No. S.63-60100, there is also a method wherein a connecting pipe is provided between an impeller inlet and an suction flow channel and accumulated sediment is caused to float by the pressure of swirling reverse flow occurring at the impeller inlet during no-discharge operation. However, with this method, when sediment has accumulated over a wide area it is difficult to cause the sediment to float sufficiently.

Further in order to further discharge sludgelike sediment there are pumps having a helical blade on a pump shaft in a pump suction opening, but because the helical blade impairs the performance of the pump during operation wherein only rainwater is being pumped these are not suitable for large drainage pump stations.

Figure 3:
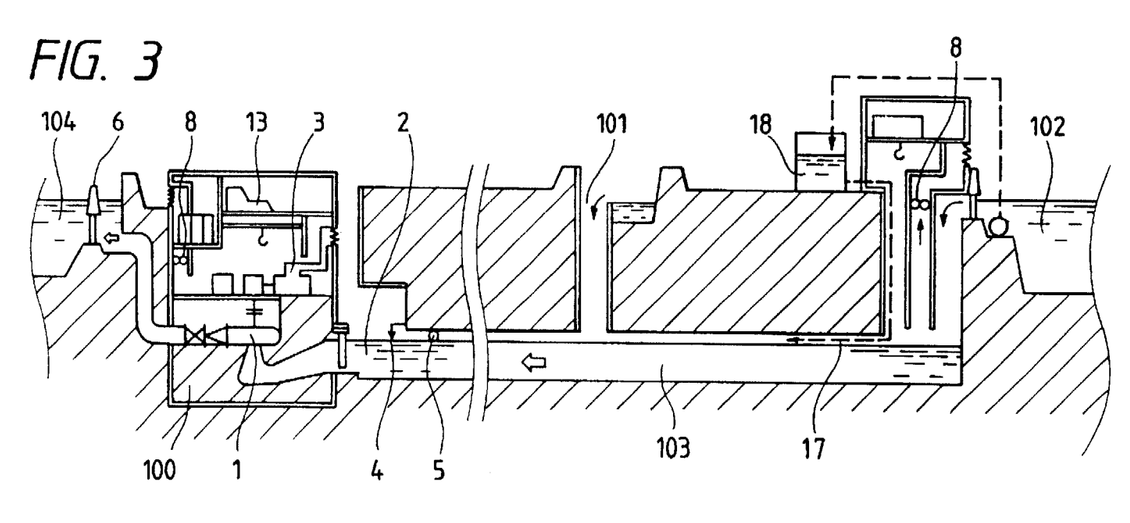
FIG. 3 is an overall vertical sectional view of another preferred embodiment of a drainage pump station of the invention.

As a countermeasure to malodorous air produced by sludge, as shown in FIG. 3 a pipe 17 for washing can be provided in a feed channel 103 and washing water can be periodically flushed down the waterway from a water supply tank 18 or the like, and ventilation of the feed channel can be carried out by blowers 8 for ventilation and deodorization. However, with this method, when the waterway is long, numerous washing pipes and blowers are necessary; also, air stagnation pockets form at various locations in the waterway and consequently it has been difficult to improve the working environment satisfactorily.

In underground drainage stations, in order to make the depth of the station shallow and reduce underground waterway diameters and pump capacities, underground waterways are sometimes operated as pressure channels which are constantly full of water during pump operation. In a drainage station of this pressure channel operation system type, because the suction head varies greatly over short periods depending on the water level in sections through which rainwater flows in from vertical shafts and upstream rivers connected to the underground waterway, there has been the problem that variation in the pump operating discharge is large. Because of this, with conventional rainwater drainage pump operating methods which presuppose relatively small discharge variations and pump well water levels which fluctuate slowly, precise operation control has been difficult. As an operation control apparatus of a pressure channel operation system type drainage station, an apparatus described in Turbo Machines Vol. 21 No. 10 pages 23 to 29 is being studied.

SUMMARY OF THE INVENTION

An object of the invention is to prevent a drainage station and a drainage basin thereof from being inundated even in a case of heavy rain exceeding the design capacity of the drainage station (severe flooding).

Another object of the invention is to make it possible to conduct maintenance operation for checking the functioning of a drainage pump and a driving engine of a drainage station in an actually loaded state without a special water supply system and make equipment for supplying water to bearing parts and shaft seal parts of the pump unnecessary.

Another object of the invention is to make it possible to discharge sediment accumulated in a feed channel and a suction sump of a drainage station and to easily carry out ventilation of underground waterways.

A further object of the invention is to make it possible to operate a pump with high reliability at all times irrespective of changes in rainwater inflow rate in a drainage station of a type wherein a pump is disposed underground and a feed channel is operated as a pressure channel.

To achieve the above-mentioned objects and other objects, a first aspect of the invention is a drainage pump station for collecting rainwater in an underground waterway and discharging it into a large river or the like, comprising: a variable capacity (for example variable speed or adjustable vane) drainage pump; a driving machine of the pump having a capacity greater than a shaft power necessary for no-discharge operation of the pump; and a water level gauge or a pressure gauge disposed in a suction sump or waterway upstream, wherein when an inflow rate exceeds the design capacity of the station, the station operates at an overload exceeding the design capacity.

A second aspect of the invention is a drainage pump station having a drainage pump for collecting rainwater in an underground waterway and discharging it into a large river or the like, comprising: a gate disposed in a drainage pump delivery side river part; and an auto-screen disposed on the river side of the gate, wherein during maintenance operation the gate in the drainage pump delivery side river part is opened and water is reverse-flow fed into the underground waterway and an actual load is applied to carry out operation checking. Preferably, a water level gauge or a pressure gauge is disposed in a suction sump or an upstream waterway of the rainwater drainage station. Also, preferably the drainage pump is a variable speed or adjustable vane pump and when during maintenance operation with an actual load applied by the gate in the drainage pump delivery side river part being opened and river water being fed into the station, with respect to sudden rainfall the speed or the vane angle is increased to conduct overload operation at a boosted discharge exceeding the design drainage discharge.

A third aspect of the invention is a drainage operating method for a drainage pump station for discharging rainwater into a large river or the like having a variable capacity drainage pump wherein a rainfall inflow prediction system based on rainfall data from rainfall radar and a waterway flow simulation for analyzing water level changes in a waterway upstream of the drainage pump station are used to predict a water level of an upstream waterway and when a change in the upstream waterway water level exceeds a pump station design value the capacity of the pump is made greater than its rated value and overload operation exceeding the design drainage discharge is carried out.

The third aspect of the invention also provides a drainage operating method for a drainage pump station for discharging rainwater into a large river or the like having a variable capacity drainage pump wherein water is reverse-flow fed from a drainage pump delivery side river part into the drainage pump station and maintenance operation is carried out with an actual load applied, a rainfall inflow prediction system based on rainfall data from rainfall radar and a waterway flow simulation for analyzing water level changes in a waterway upstream of the drainage pump station are used to predict a water level of an upstream waterway and sudden rainfall during maintenance operation is predicted in advance by the waterway flow simulation and whether or not maintenance operation is possible or a maintenance operation load (suction sump water level) is decided accordingly.

A fourth aspect of the invention is drainage operating method for a drainage pump station for passing rainwater through an underground waterway and discharging it into a downstream side river or the like wherein: there are provided a variable capacity drainage pump and a water level gauge or a pressure gauge disposed in a suction sump or the underground waterway; when data from the water level gauge or the pressure gauge indicates that an inflow rainwater discharge is decreasing the capacity of the pump is reduced and the water level of the underground waterway is kept above a fixed value; when the capacity of the pump reaches a minimum rated value the delivery side of the pump is closed and no-discharge operation of the pump is carried out; and when after change in the underground waterway water level is monitored for a fixed period change in the water level becomes substantially nil the drainage discharge of the pump is increased to a capacity at which sediment in the underground waterway can be discharged and remaining water is discharged. Preferably, the drainage pump is a variable speed or adjustable vane mixed flow pump and a driving machine thereof has a capacity greater than a shaft power necessary for no-discharge operation of the pump. Also, a rainfall inflow prediction system and a waterway flow simulation are used to predict upstream water level changes and when it is predicted that an inflow rate from upstream will increase no-discharge operation or low-speed operation of the pump is canceled.

A fifth aspect of the invention is a combined sewerage system type drainage pump station for passing rainwater and sewage through an underground waterway into a suction sump and discharging it into a downstream side river with a drainage pump, comprising: a variable capacity drainage pump; a water level gauge or a pressure gauge disposed in a suction sump or the underground waterway; a downstream settling basin disposed on the drainage pump delivery side; and a control apparatus which when data from the water level gauge or the pressure gauge indicates that an inflow rainwater discharge is decreasing reduces the capacity of the pump and keeps the water level of the underground waterway above a fixed value, when the capacity of the pump reaches a minimum rated value closes the delivery side of the pump and conducts no-discharge operation of the pump, and when after change in the underground waterway water level is monitored for a fixed period change in the water level becomes substantially nil increases the drainage discharge of the pump to a capacity at which sediment in the underground waterway can be discharged and discharges remaining water.

A sixth aspect of the invention is a combined sewerage system drainage pump station for passing rainwater and sewage through an underground waterway into a suction sump and discharging it into a downstream side river with a drainage pump, comprising: a suction blower disposed at the top of the suction sump; and interstage valves disposed at the entrances of vertical shafts, wherein the suction blower disposed at the top of the suction sump is operated and the interstage valves are sequentially opened from upstream and the underground waterway is thereby ventilated.

Preferably there are further provided a water level gauge or a pressure gauge disposed in the suction sump or the underground waterway and a control apparatus which when data from the water level gauge or the pressure gauge indicates that an inflow rainwater discharge is decreasing reduces the speed or the vane angle of the pump and keeps the water level of the underground waterway above a fixed value, when the speed or the vane angle of the pump reaches a minimum rated value closes the delivery side of the pump and conducts no-discharge operation of the pump and closes the interstage valves in the vertical shafts, and when after change in the underground waterway water level is monitored for a fixed period change in the water level becomes substantially nil brings the pump to a rated speed or a design vane angle and discharges water remaining in the underground waterway. Also, preferably there are further provided: a driving machine of the pump having a capacity greater than a shaft power necessary for no-discharge operation of the pump; a gate disposed in a drainage pump delivery side river part and having an auto-screen disposed on the river side thereof; and a downstream settling basin disposed above ground on the drainage pump delivery side upstream of the gate, and during maintenance operation the gate in the drainage pump delivery side river part is opened and water is fed in reverse-flow and after a fixed period of no-discharge operation the pump is brought to a rated speed or a design vane angle and drainage operation is carried out. Preferably there are provided a rainfall inflow prediction system and a waterway flow simulation, and sudden rainfall during water feeding is predicted in advance and judgment of whether or not maintenance operation is possible or changeover from water feeding to water discharge at a time of sudden rainfall is carried out accordingly.

A seventh aspect of the invention is a drainage pump station for passing rainwater through an underground waterway into a suction sump and during pump operation operating the underground waterway as a pressure channel at all times and discharging the rainwater into a downstream side river, comprising: a variable capacity drainage pump; and a driving machine of the pump having a capacity greater than a shaft power necessary for no-discharge operation of the pump, wherein the pump is controlled so that the water level in the underground waterway is constant. Preferably, the drainage pump is a variable speed or adjustable vane pump and there are further provided a water level gauge or a pressure gauge disposed in the suction sump or the underground waterway and a control apparatus for controlling the operation of the pump so that the water level in the underground waterway is a constant value. Also, a rainfall inflow prediction system and a waterway flow simulation are used to predict a water level in the underground waterway and operation control of the pump is so performed that the water level in the underground waterway is a constant value.

According to the invention described above the following operations are possible:

(1) Because the driving machine of the pump has a capacity greater than the shaft power necessary for no-discharge operation of the pump and in the case of a large rainfall greater than the design rainfall capacity of the pump station (severe flooding) the pump is operated at an overload exceeding the design discharge, overhead flooding inundation of the drainage pump station and drainage basins can be prevented even during severe flooding.

(2) During maintenance operation it is possible to check the functioning of the pump and the driving machine in an actually loaded state by feeding water into the station from a river on the delivery side of the pump station. As a result, highly reliable maintenance operation is possible, and it is possible to dispense with equipment for supplying water to the bearings and shaft seals of the pump. Also, because during maintenance operation the station is filled with water before being drained, it is possible to change the air in underground waterways simultaneously with the maintenance operation.

(3) In the case of a large rainwater inflow into an underground drainage station, by operating the pump at the necessary capacity, keeping the water level in an underground waterway above a fixed value by lowering the pump capacity when the rainwater inflow has fallen, and increasing the pump discharge to a capacity at which sediment can be discharged when the rainwater inflow has become substantially zero, it is possible to discharge sediment inside the station at the same time as water remaining in the station is drained. Also, by providing a suction blower in the top of a suction sump and disposing interstage valves at the entrances of vertical shafts, and when draining remaining water from the underground waterway operating the suction blower and simultaneously opening the vertical shaft interstage valves sequentially from upstream, it is possible to change the air in the underground waterway during drainage.

(4) By making an underground station one which operates a feed channel as a pressure channel, making the pump a variable capacity pump and controlling it so that the water level in an underground waterway is constant, it is possible to reduce the frequency of starting and stopping of the pump and operate the pump highly reliably at all times irrespective of changes in rainwater inflow.

Other features and objects and merits of the invention will be clear from the following description made with reference to the accompanying drawings.

DETAILED DESCRIPTION OF THE PREFERRED EMBODIMENTS

Figure 8:
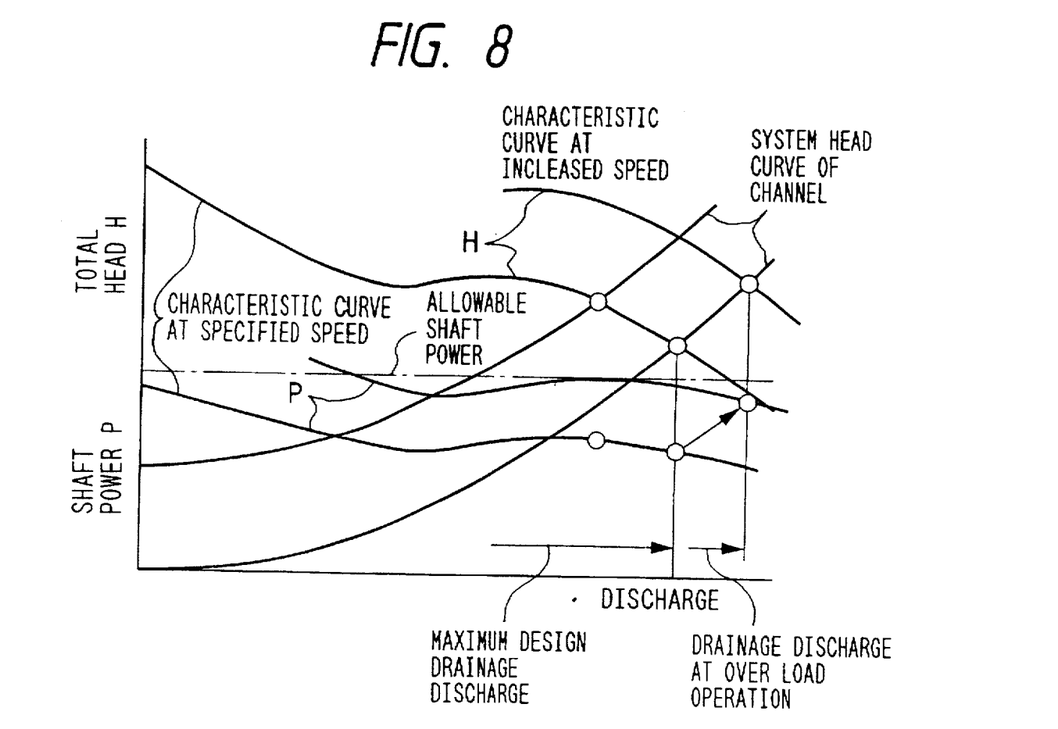
FIG. 8 is a graph illustrating how a pump operating point changes when the pump speed is changed.
Figure 9:
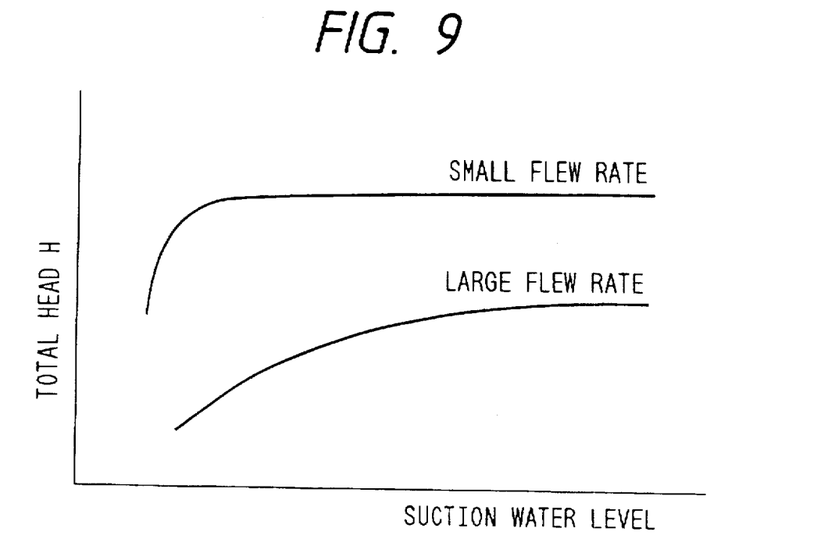
FIG. 9 is a graph illustrating the suction performance of an axial flow pump.

In a rainwater drainage station, because a large water discharge is drained at a relatively low head, an axial flow pump or a mixed flow pump is used as the drainage pump. Because the shaft power of such a pump is generally maximum at the no-discharge point, conventionally no-discharge operation has been avoided and equipment has been planned with a driving machine of a capacity of about 120% of the shaft power necessary at the rated discharge point of the pump. On the other hand, when the speed or the vane angle of the pump becomes large, the operating point of the drainage pump moves to the large discharge side of the design point as shown in FIG. 8; however, because the large discharge side shaft power is lower than that at the design point, the speed can be increased by about 10% without overloading the driving machine. Also, as shown in FIG. 9, the suction performance, which can be an obstacle to over discharge operation, does not suddenly decrease, and in the case of a rainwater drainage station, because in situations in which this kind of large discharge operation is necessary the suction water level is high, drainage with a drainage pump almost never becomes impossible due to cavitation during large discharge operation.

Accordingly, in this invention, when an existing drainage pump is variable speed or adjustable vane, operation above the rated speed or the design vane angle within the capacity of the driving machine is conducted, and drainage exceeding the design drainage discharge set when the station was constructed is thereby performed. Also, if the driving machine is replaced with one having a capacity greater than the shaft power necessary for no-discharge operation of the pump, overload operation throughout the discharge range becomes possible. That is, a water level gauge or a pressure gauge is disposed in a suction sump or an upstream waterway and changes in inflow rate are monitored, and when there is an inflow of rainwater exceeding the design drainage discharge of the station, emergency overload drainage operation with drainage given priority over the lives of the pump and the driving machine can be conducted.

Figure 10:
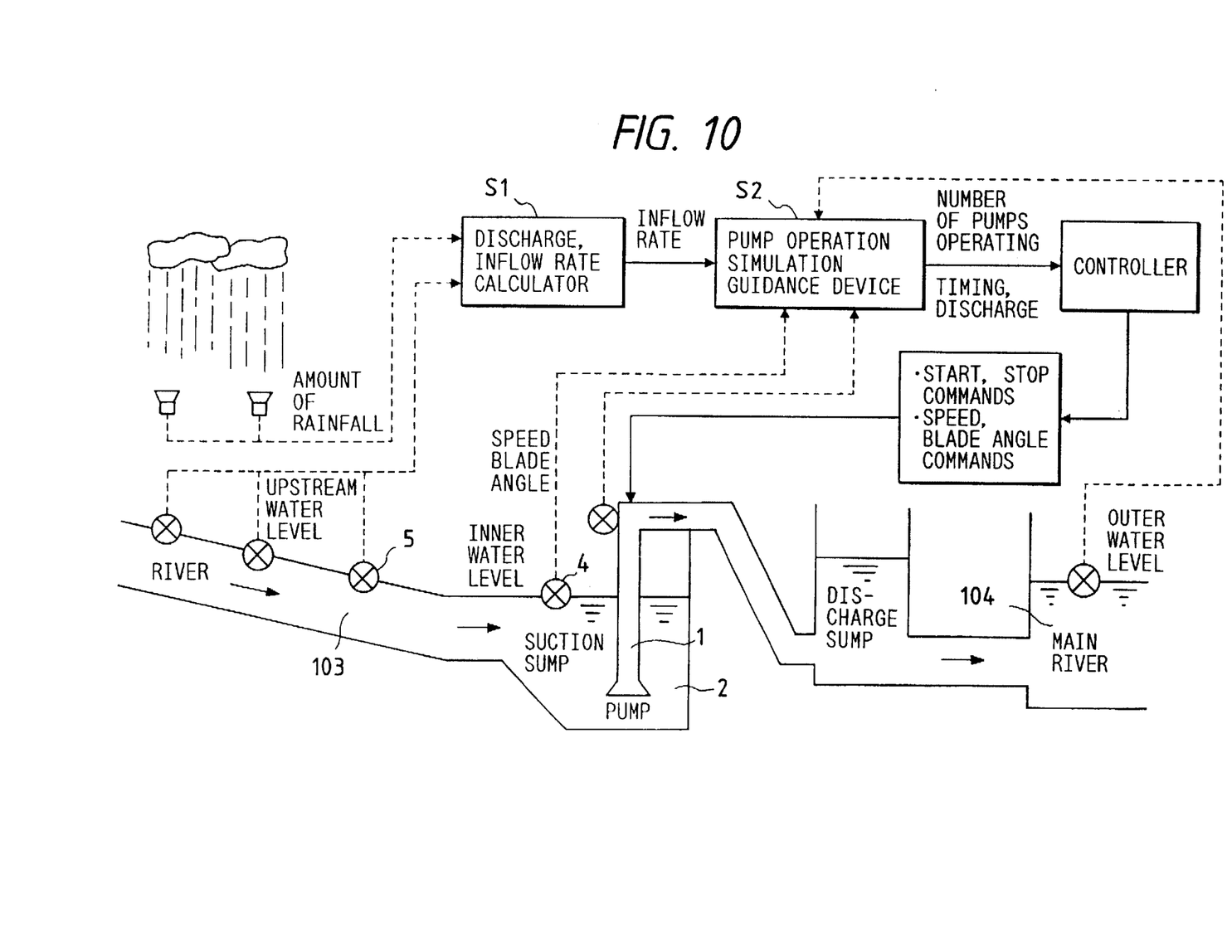
FIG. 10 is a drawing illustrating pump control based on rainfall prediction and flow simulation.

Furthermore, by providing and rainfall radar of the kind shown in FIG. 10, a rainfall inflow prediction system based on rainfall data and a waterway flow simulation for analyzing water level changes in upstream waterways and using these together, upstream waterway water levels are predicted. The necessity of emergency drainage operation of the pump is then studied comprehensively, taking into account upstream water levels, and a minimum necessary overload operation time is decided.

A gate is disposed in a drainage pump delivery side river part, an auto-screen is provided on the river side of the gate, and for maintenance operation river water is fed from the downstream river into the drainage station. Here, a water level gauge or a pressure gauge is disposed in a suction sump or an upstream waterway and the water level there is monitored while a required quantity of water is fed into the drainage station. When this is done, maintenance operation simulating various load states is possible, and also the need to newly provide equipment for supplying water to ceramic bearings and ceramic shaft seals widely used in drainage pumps is eliminated.

Also, sudden rainfall during maintenance operation can be predicted by the water inflow prediction system and the waterway flow simulation, judgment of whether or not maintenance operation is possible and changeover from water feeding to drainage operation when rain suddenly falls are possible, and overhead flooding inundation of the station and its drainage basin due to drainage being carried out too late can be prevented.

Figure 13:
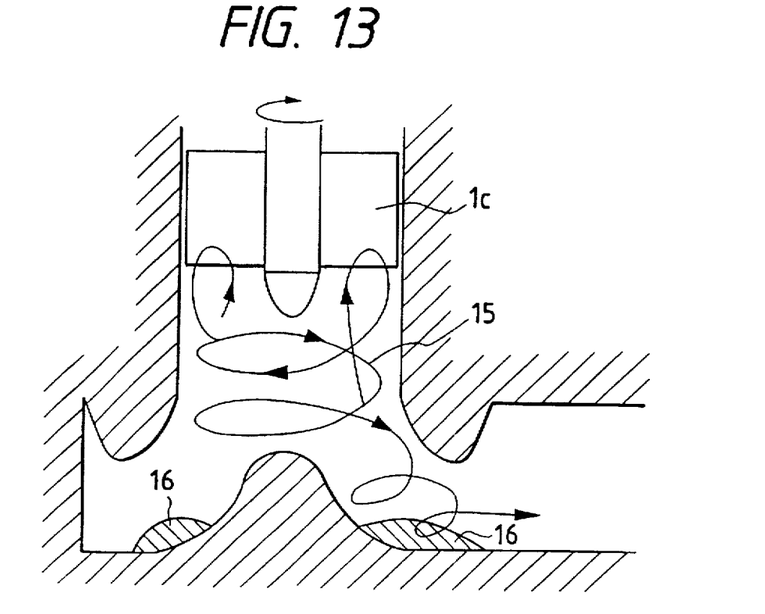
FIG. 13 is a view illustrating sludge agitation caused by reverse flow at an impeller inlet.

Furthermore, if the drainage pump is made mixed flow or axial flow, as shown in FIG. 13 it is possible to circulate flow from an impeller intake to a suction sump by means of reverse flow occurring at the impeller intake during no-discharge operation. Therefore, when from data from a water level gauge or a pressure gauge in the suction sump or an upstream waterway it is known that an inflow rate is decreasing, the discharge is reduced by reducing the speed or the vane angle of the pump, and with a drainage discharge above a minimum discharge at which drainage can be performed without sediment accumulating the water level in the underground waterway is kept above a fixed value above which vortexes and the like do not occur in the suction sump. When the speed or the vane angle of the pump reaches a minimum rated value, i.e. when the minimum discharge at which drainage can be performed without sediment accumulating is reached, a delivery valve is closed and no-discharge operation is conducted. By conducting no-discharge operation with the water level constant, reverse flow from the impeller agitates sediment contained in the rainwater and prevents it from settling, and also because the water level is above a rated level the limit speed at which sediment can be discharged can be guaranteed during the drainage operation. Therefore, when after changes in the water level in the underground waterway are monitored for a fixed time change in the water level becomes substantially nil, by conducting drainage of the remaining water at 100% speed or at the design vane angle, sediment can be discharged into the downstream side river together with the remaining water.

In this case also, upstream side water level changes are predicted using a rainfall inflow prediction system and a waterway flow simulation and when it is predicted that an inflow rate from upstream will increase no-discharge operation or low-speed operation is canceled and overhead flooding inundation of the station and its drainage basin due to drainage being carried out too late is prevented.

By feeding river water up to the top of the highest part of an underground waterway during maintenance operation, air in the underground waterway is all automatically discharged through vertical shafts and upstream river inflow entrances, and certain ventilation of the entire underground waterway can thereby be carried out.

By making a drainage pump in a combined sewerage system type underground drainage pump station variable speed or adjustable vane and providing interstage valves in entrances of vertical shafts and further providing a water level gauge or a pressure gauge in a suction sump or an underground waterway, it is possible to perform control of the interstage valves in the vertical shaft entrances in correspondence with pump discharge control from water level changes in the underground waterway. That is, when from data from the water level gauge or the pressure gauge it is known that the inflow rate is decreasing, the speed or the vane angle of the pump is reduced and the water level in the underground waterway is kept above a rated value, and when the speed or the vane angle of the pump reaches a minimum rated value a delivery valve is closed and no-discharge operation is conducted. The interstage valves in the vertical shafts are closed during this no-discharge operation and air is thereby prevented from entering and leaving the vertical shafts. Next, when after changes in the water level in the underground waterway are monitored for a fixed time change in the water level becomes substantially nil, drainage of the remaining water is carried out at 100% speed or at the design vane angle, the interstage valves in the vertical shafts are opened sequentially from upstream, and by extracting air from the suction sump which is the downstream end of the waterway with a blower the air in the underground waterway can be automatically replaced with atmospheric air from upstream.

In the above-mentioned pump station, by providing a downstream settling basin it becomes possible to remove from the suction sump sludge which is contained in sewage and gradually accumulates and collect it in the downstream settling basin. That is, during maintenance operation the gate in the drainage pump delivery side river part is opened and water is reverse-flow fed into the station. At this time, because the river water flows in with a head drop from the impeller of the pump into the part where sludge accumulates, the momentum of the inflow water stirs up the sludge and the accumulated sludge can be mixed with the river water. Also, by conducting no-discharge operation for a fixed time, reverse flow accompanying swirling occurring at the inlet of the impeller agitates and disperses and makes uniform the concentration of the sludge mixed in with the river water, and thereafter by conducting drainage operation with the speed increased to 100% or the vane angle increased to the design vane angle sludge can be collected in the downstream settling basin without any damaging effect on the pump.

Figure 14:
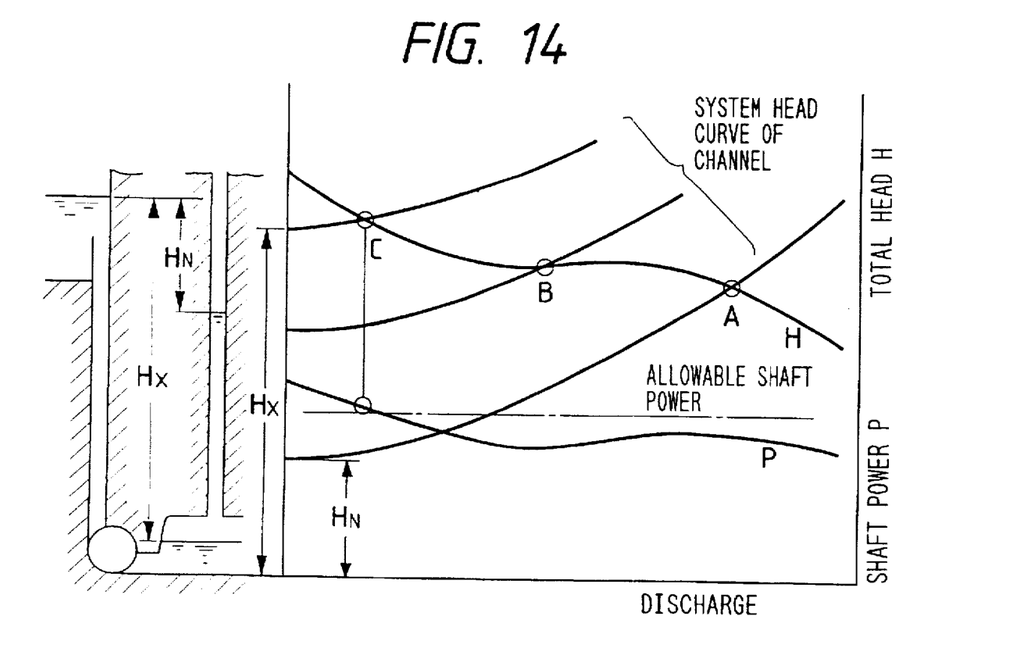
FIG. 14 is a graph illustrating changes in operating point with suction water level of a pump station wherein a feed channel is operated as a pressure channel.

Normally an axial flow pump or a mixed flow pump is used as the drainage pump, but with these pumps as shown in FIG. 14 at point C the shaft power in partial discharge regions increases and near point B operation control has poor head characteristics. Therefore, to avoid operation at such discharge points, operation is limited to the vicinity of the design point. On the other hand, in a rainwater drainage pump station disposed underground, when during pump operation an underground feed channel is operated as a closed channel, as shown in FIG. 14 the pump suction pressure varies depending on water levels in vertical shafts connected to the underground feed channel and correspondingly the pump operating point constantly moves between the points A, B and C. Therefore, it becomes necessary to control the operating point by means of speed control or impeller vane angle control of the pump. However, because with a drainage pump whose feed channel is operated as a pressure pipe the required drainage discharge varies in connection with the suction water level, if there is no problem in partial discharge operating regions, operation control is not particularly necessary. Therefore, if the driving machine has a capacity greater than the shaft power necessary for no-discharge operation of the pump, pump control becomes completely unnecessary.

Specific preferred embodiments of the invention will now be described with reference to the accompanying drawings.

Figure 1:
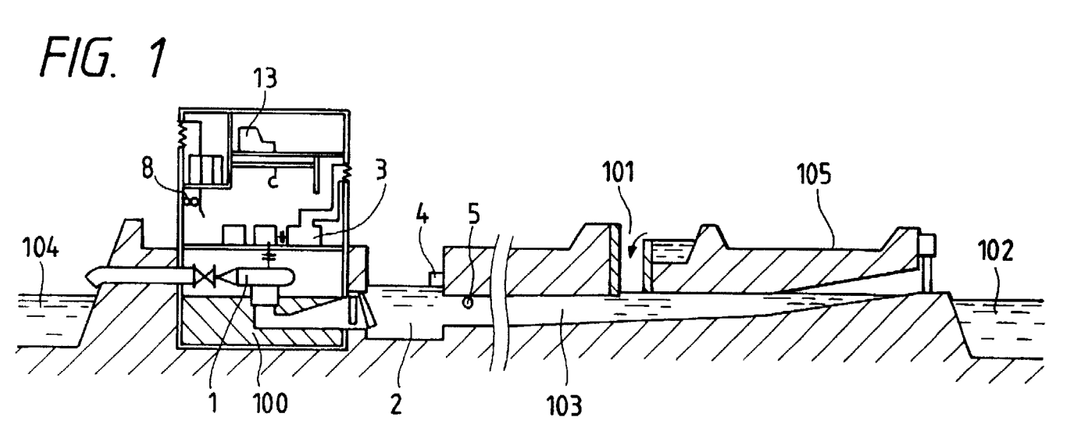
FIG. 1 is an overall vertical sectional view of a preferred embodiment of a drainage pump station of the invention.

FIG. 1 is an overall sectional view of a preferred embodiment of a rainwater drainage pump station according to the invention. Rainwater flowing in from a vertical shaft 101 or an upstream-side river 102 passes through a feed channel 103 into a suction sump 2 of a drainage pump station 100 and is discharged by a drainage pump 1 into a downstream-side river 104. In FIG. 1 the drainage pump 1 is a variable speed, axial flow pump and a driving machine 3 has a capacity greater than the shaft power necessary for no-discharge operation of the pump. A water level gauge 4 or a pressure gauge 5 are provided in the suction sump 2 or the feed channel 103.

Because the drainage pump station is of the construction described above, even when from changes in water level data obtained from the water level gauge 4 or the pressure gauge 5 an inflow of rainwater exceeding the maximum drainage discharge estimated when the drainage pump station was designed is anticipated, operation exceeding the design drainage discharge is possible. That is, because the drainage pump 1 is variable speed, in an emergency such as when overhead flooding inundation of the drainage pump station 100 and a drainage basin 105 is anticipated, it is possible to increase the speed of the pump within the capacity of the driving machine 3. Because the shaft power of the pump increases in proportion with the cube of the speed and the discharge of the pump increases in proportion with the speed, when for example the speed is increased by 10% the shaft power increases to 1.33 times the rated speed. However, because normally the capacity of the driving machine is designed at 120 to 130% of its rated capacity, operation exceeding the design drainage discharge by 10% is possible without causing any problem with the driving machine.

When an axial flow pump is used as the drainage pump, the no-discharge shaft power reaches nearly 200% of the shaft power at the point of maximum efficiency. Therefore, in the case of a driving machine installed in anticipation of no-discharge operation, on the large-discharge range of the point of maximum efficiency, even if the speed is increased by 25 to 30% the shaft power remains within the allowable limit, as shown in FIG. 8. That is, operation at a over discharge by 25 to 30% is possible. Also, as shown in FIG. 9, the suction performance, which can be an obstacle to over discharge operation, does not suddenly decrease, and because in situations in which this kind of large discharge operation is necessary the suction water level becomes high, suction performance is not a fatal obstacle to large discharge operation of a drainage pump. Thus in this preferred embodiment it is possible to carry out emergency operation with drainage given priority over the life of the pump and thereby prevent flooding of the drainage pump station 100 and the drainage basin 105.

Also, by a rainfall inflow prediction system based on rainfall data from rainfall radar and a waterway flow simulation for analyzing water level changes in the feed channel 103 being built into a control panel 13 of the drainage pump station shown in FIG. 1, reliability with respect to emergency drainage can be increased further.

Figure 11:
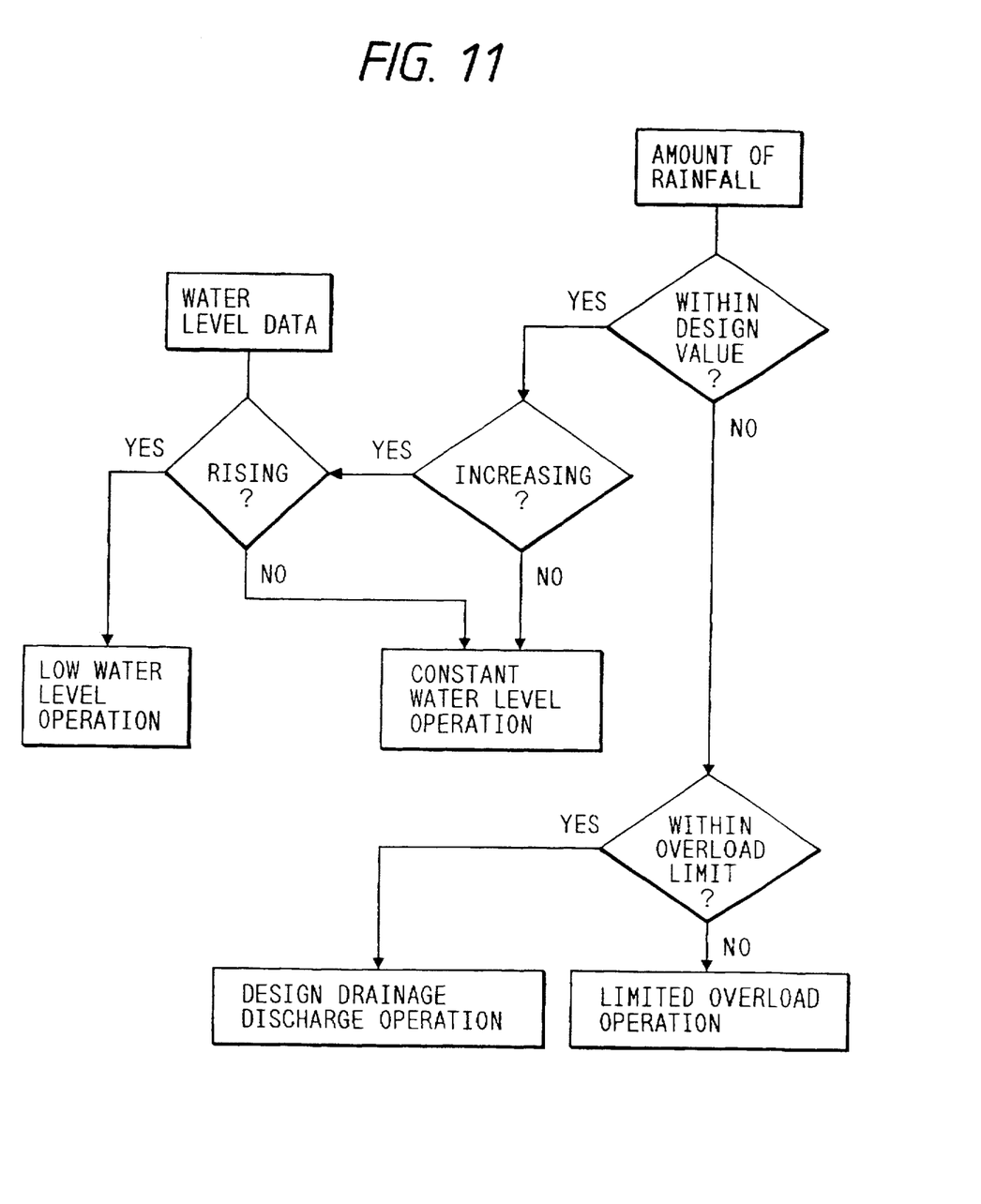
FIG. 11 is a chart illustrating limit overload operation modes of the invention.

That is, as shown in FIG. 10, in addition to water level data from the water level gauge 4 or the pressure gauge 5, by using a rainfall inflow prediction system S1 and a waterway flow simulation S2 to predict water level changes in an upstream waterway, even with respect to rainwater exceeding the maximum drainage discharge anticipated when the drainage pump station was designed, optimum operation control of the drainage pump 1 can be carried out as shown in FIG. 11.

First, when upstream water levels are increasing and rainfall in upstream drainage basins is also increasing, the drainage pump 1 is operated in advance until the lowest water level at which vortexes do not occur in the suction sump is reached. When the rainfall inflow prediction system predicts an inflow of rainwater greater than the maximum drainage discharge anticipated when the drainage pump station was designed, the waterway flow simulation can be used to predict when the rainwater will reach the drainage pump station 100 and until that time the drainage pump 1 can be operated at its design drainage discharge so that it is being operated with a balance being struck between the capability and the life of the pump. Also, when severe flooding exceeding the limit of that which can be drained even by overload operation at above the rated speed is predicted, overload operation at the capacity limit of the driving machine can be carried out immediately irrespective of the water level in the suction sump or the inflow rainfall.

Figure 2:
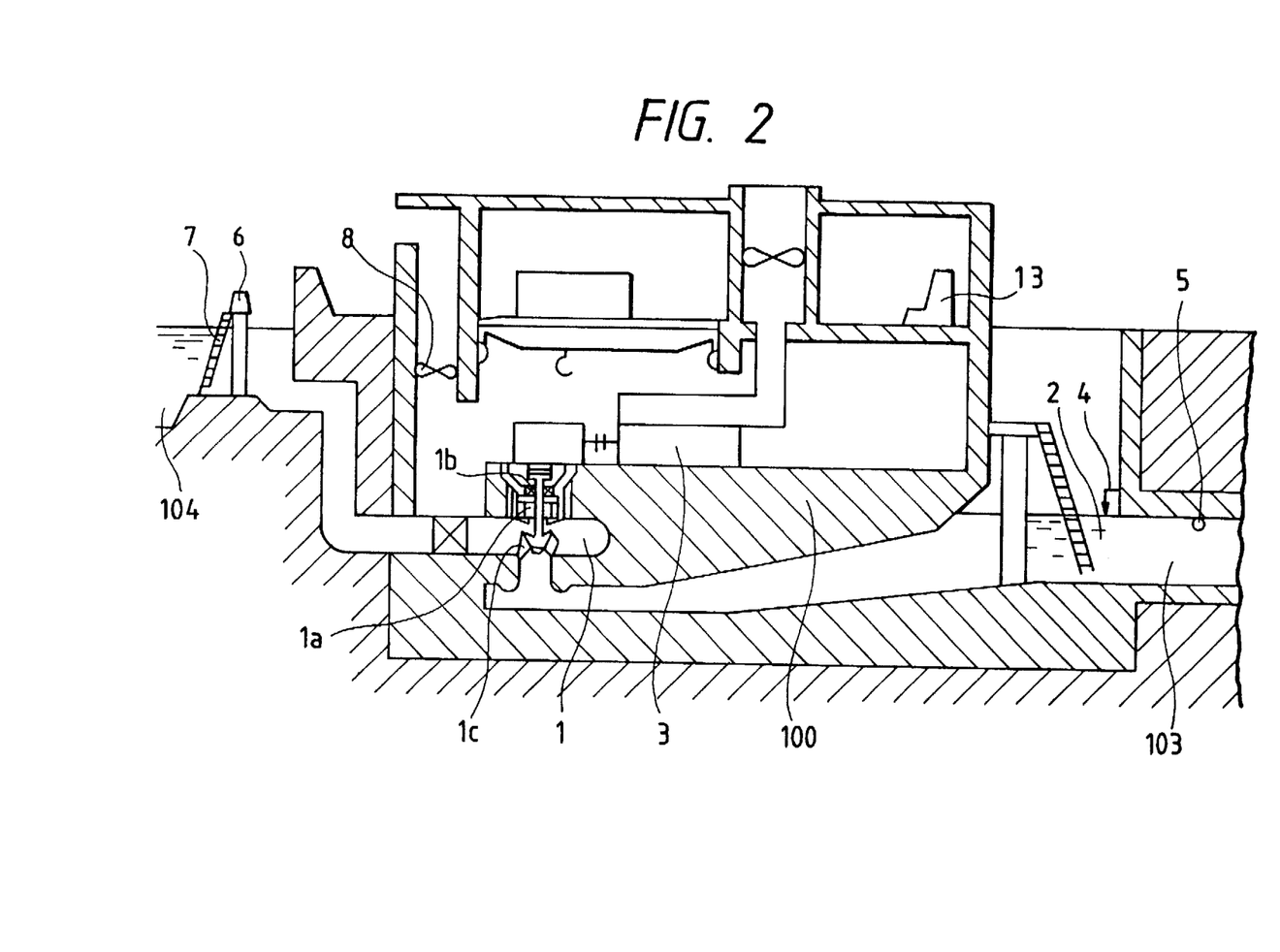
FIG. 2 is a vertical sectional view of a pump station part of a partly modified version of the drainage pump station shown in FIG. 1.

FIG. 2 is a sectional view of a main part of a partly modified example of a drainage pump station according to the invention. In FIG. 2, a water level gauge 4 or a pressure gauge 5 is disposed in a suction sump 2 or in a feed channel 103, and a gate 6 having an auto-screen 7 on the river side thereof is disposed in a drainage pump 1 delivery side river 104.

Because the drainage pump station of this invention has the above construction, during maintenance operation for periodically checking the functioning of the drainage pump 1 and other equipment, by opening the gate 6 and feeding river water from the delivery side river 104 into the drainage pump station while checking the water level by means of the water level gauge 4 or the pressure gauge 5 disposed in the suction sump 2 or the feed channel 103, necessary load conditions can be established. The auto-screen 7 disposed on the river side of the gate 6 removes dirt from the river water, and except when feeding of water for maintenance operation is being carried out the auto-screen 7 is withdrawn upward. In this example drainage operation of the drainage pump 1 is possible at any time, irrespective of the weather, and higher-reliability maintenance operation can be carried out.

Also, in the example shown in FIG. 2, by the drainage pump 1 being made a variable speed or adjustable vane pump, the reliability of the station can be assured even with respect to sudden rain during maintenance operation. That is, with respect to sudden rain during maintenance operation, overload operation can be carried out with the speed of the drainage pump 1 increased to above its design speed and overhead flooding inundation of the drainage pump station 100 and the drainage basin 105 by a sudden inflow of rainwater during maintenance operation can be prevented. In this case the shaft power increases, but as shown in FIG. 8 the operating point of the pump is on the large discharge range of the design point and because at the large discharge range shaft power is lower than that at the design point the speed can be increased by about 10% without the driving machine being overloaded.

Furthermore, by a rainfall inflow prediction system based on rainfall data from rainfall radar and a waterway flow simulation for analyzing water level changes in the feed channel 103 being built into a control panel 13 of the drainage pump station shown in FIG. 2, reliability can be increased further. That is, when during maintenance operation the gate 6 in the drainage pump 1 delivery side river 104 is opened, reverse-flow water feeding is carried out, a load is thereby applied and operation checking is performed, sudden rain during maintenance operation can be predicted by the waterway flow simulation in advance and the feasibility or otherwise of the maintenance operation can be judged, and it is possible to decide drainable load discharge, i.e. suction sump water levels for maintenance operation which are safe even with respect to sudden flooding. As a result, even if there is rain during maintenance operation, drainage will not be carried out too late.

In the drainage pump station shown in FIG. 2, by using ceramics for a bearing $1a$ and a shaft seal $1b$ of the drainage pump 1, maintenance of the bearing $1a$ and the shaft seal $1b$ is easy. Also, in this example, because maintenance operation is carried out using water fed into the drainage pump station from the delivery side river 104, the supply of cooling water to the bearing and shaft seal not required even if maintenance operation carry out dry-running .

FIG. 3 is an overall sectional view showing an example of a drainage pump station according to the invention. In FIG. 3, a drainage pump 1 is a variable speed or adjustable vane mixed flow pump or axial flow pump, and a driving machine 3 has a capacity greater than the shaft power necessary for no-discharge operation of the pump. Also, a water level gauge 4 or a pressure gauge 5 are installed in a suction sump 2 or an underground waterway 103.

Figure 12:
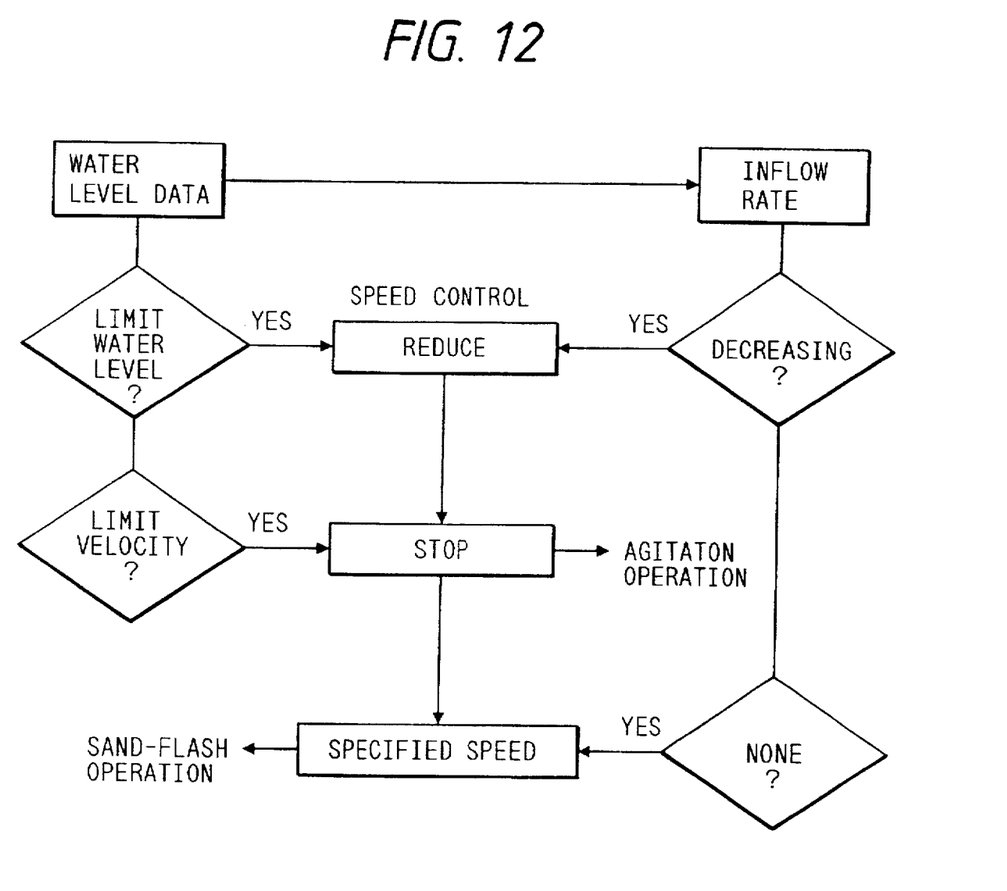
FIG. 12 is a chart illustrating drainage operation modes of the invention.

In the drainage pump station of this invention, a drainage operation mode suitable for sand-flushing operation will be described with reference to the chart of FIG. 12.

When data from the water level gauge 4 or the pressure gauge 5 in the suction sump 2 or the feed channel 103 indicate that a rainwater inflow rate is decreasing, the speed or the vane angle of the drainage pump 1 is reduced to the lowest velocity at which sediment can be discharged (the limit flow speed), and operation is so carried out that the water level of the underground waterway is kept above a constant value so that no problems such as large discharge drainage operation causing the water level to fall suddenly and suction vortexes to occur are caused. When the pump speed or vane angle has reached or fallen below its minimum specified value, by closing a delivery valve and carrying out no-discharge operation, no-discharge operation can be carried out at a rated water level and sediment contained in the rainwater is agitated and does not settle. After monitoring changing of the underground waterway water level for a fixed time, when the water level has substantially ceased to change (when the water flowing into the drainage pump station has become substantially 0), drainage of the remaining water is carried out at 100% speed or at the design vane angle. As a result, the flow speed exceeds the lower limit at which discharge of sediment is possible and sediment in the rainwater can be discharged into the downstream-side river along with the remaining water.

In this preferred embodiment, based on water level data and results of prediction of hour-by-hour and moment-by-moment water level changes by waterway flow state simulation it is possible to keep the discharge at the end of a drainage operation above a fixed value as described above. Therefore, because it is possible to keep the waterway velocity at the end of drainage above the sedimentation speed of the sediment, the accumulation in the waterway of sediment contained in rainwater can be prevented.

Furthermore, by a rainfall inflow prediction system based on rainfall data from rainfall radar and a waterway flow simulation for analyzing water level changes in the feed channel 103 being built into a control panel 13 of the drainage pump station shown in FIG. 3, reliability of drainage with respect to worrying sudden flooding can be maintained by drainage discharge control. That is, upstream water level changes are predicted using water level data from the water level gauge or the pressure gauge together with the simulation, and because when it is predicted that the inflow rate from upstream will rise the no-discharge operation or low-speed operation can be canceled before the water level in the suction sump rises, it is possible to prevent flooding of the station and drainage basins adjacent to the river and the like by sudden rainwater inflow during agitating operation.

Figure 4:
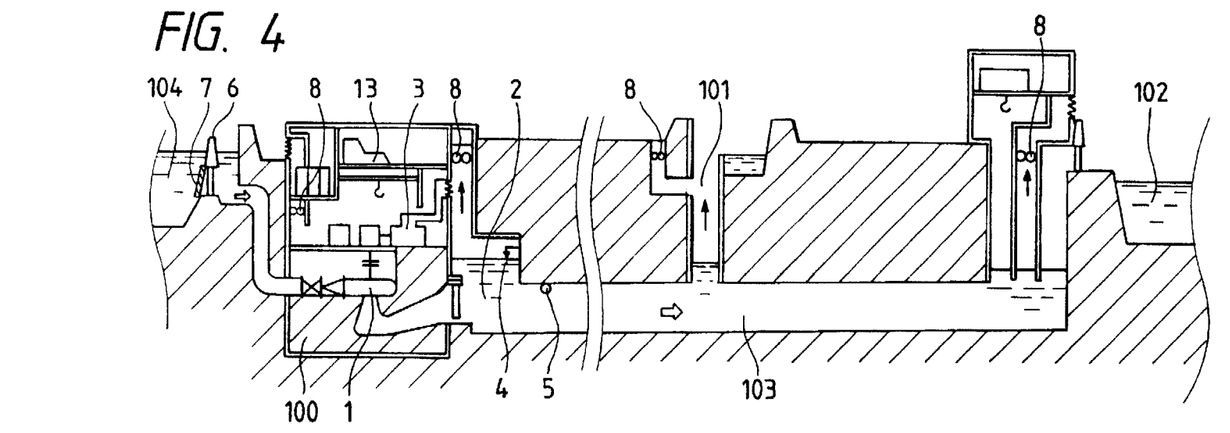
FIG. 4 is an overall vertical sectional view of a partly modified version of the drainage pump station shown in FIG. 3.

FIG. 4 is a partly modified example of the underground drainage pump station shown in FIG. 3. In this example, a gate 6 having an auto-screen 7 on the river side thereof is disposed in a drainage pump 1 delivery side river 104 and a water level gauge 4 or a pressure gauge 5 is disposed in a suction sump 2 or in an underground waterway 103. When during maintenance operation river water is fed from the delivery side river 104, the water level is monitored while water is fed until the water level reaches the top of the underground waterway 103. As a result, because air in the underground waterway 103 can be entirely replaced with river water, underground waterway ventilation apparatuses 8 need only be of a capacity to ventilate the spaces of a vertical shaft part 101 and an intake part 102 from the upstream-side river, and ventilation equipment of the vertical shaft part 101 and the intake part 102 from the upstream-side river can be downsized. Also, since there is no danger of stagnation of air occurring in the underground waterway 103, preventive detection devices provided at different locations in the underground waterway 103 can be simplified.

Furthermore, by a rainfall inflow prediction system based on rainfall data from rainfall radar and a waterway flow simulation for analyzing water level changes in the upstream waterway 103 being built into a control panel 13 of the drainage pump station shown in FIG. 4, reliability of drainage with respect to sudden flooding occurring while maintenance operation with water fed from the delivery side river 104 is being carried out can be maintained. That is, by predicting sudden rainfall likely to occur while water feeding is being carried out in advance by means of the waterway flow simulation, it can be judged in advance whether or not the maintenance operation can be carried out, and even if water feeding is in progress the operation can be changed over to drainage before the rainwater arrives at the suction sump.

Figure 5:
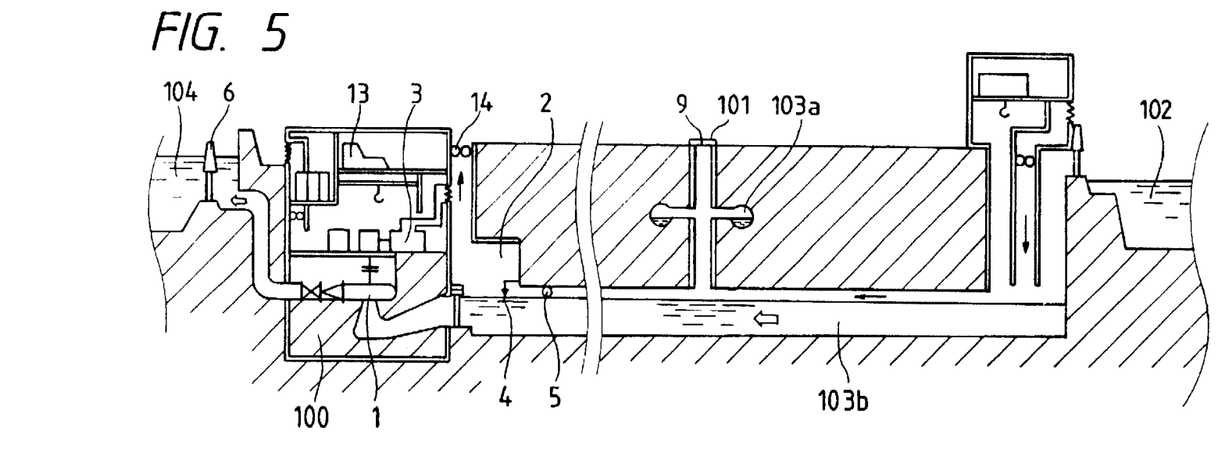
FIG. 5 is an overall vertical sectional view of a combined sewerage system type underground drainage pump station which is a partly modified version of the drainage pump station shown in FIG. 3.

FIG. 5 is an overall sectional view of a preferred embodiment of the invention applied to a combined sewerage system pump station for passing rainwater and sewage through an underground waterway into a suction sump and draining it into a downstream side main river. In a combined sewerage system, when only sewage flows in, the sewage flows through a sewage-only channel 103a before it is drained, but when rainwater flows in, because rainwater and sewage flow through an underground waterway 103b together, rainwater containing a high concentration of sewage flows through the underground waterway 103b at the end of the draining and causes a bad odor after drainage.

In this preferred embodiment, city area rainwater collecting vertical shafts 101 are provided with interstage valves 9. Also, the drainage pump 1 is variable speed or adjustable vane, and a water level gauge 4 or a pressure gauge 5 are disposed in the suction sump 2 or the underground waterway 103b. When from data from the water level gauge 4 or the pressure gauge 5 it is known that an inflow rainwater discharge is falling, the speed or the vane angle of the drainage pump 1 is reduced and the water level in the underground waterway 103b is kept above a rated value, and when the speed or the vane angle of the pump has fallen below the respective rated value a delivery valve 10 is closed and no-discharge operation is carried out. During this no-discharge operation the interstage valves 9 are closed, change in the underground waterway water level is monitored for a fixed time, and when change in the water level has become substantially nil drainage of the remaining water in the underground waterway is carried out at 100% speed or at the design vane angle. At this time, the vertical shaft interstage valves 9 are opened one after another from the upstream side. By performing the above-mentioned interstage valve control, air can be discharged from the underground waterway 103b along with the drainage and the air in the underground waterway can be replaced with fresh outside air at the end of the drainage. As a result, the underground waterway can be amply ventilated even with low-capacity ventilation equipment.

As shown in FIG. 5, a suction blower 14 can be mounted at the top of the suction sump 2, and when the speed is increased to 100% or the vane angle is increased to the design vane angle and the remaining water in the underground waterway is drained, the suction blower 14 is operated and even more complete ventilation can be effected.

Figure 6:
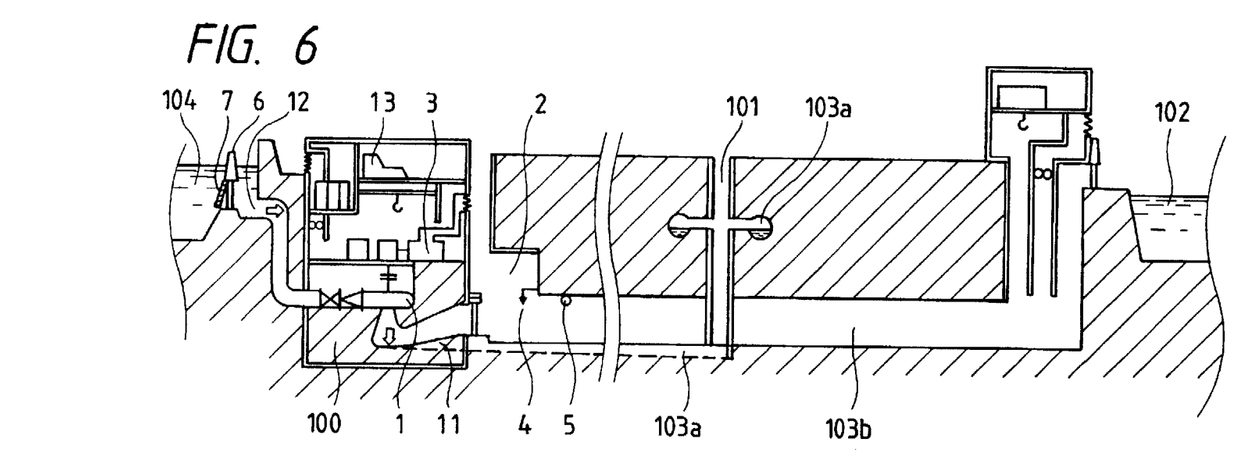
FIG. 6 is an overall vertical sectional view of another version of the combined sewerage system type underground drainage pump station shown in FIG. 5.

FIG. 6 is a partly modified example of the combined sewerage system drainage pump station shown in FIG. 5. In a combined sewerage system, when only sewage flows in, the sewage flows through a sewage-only channel 103a before it is drained, but because the sewage flows through an open waterway having a free surface its flow speed is slow and a sewage well 11 has been necessary immediately in front of the pump to collect waste matter in the sewage. The drainage pump 1 is a mixed flow pump or an axial flow pump, and a driving machine 3 has a capacity greater than the shaft power necessary for no-discharge operation of the pump. A gate 6 having an auto-screen 7 on the river side thereof is disposed in a drainage pump delivery side river 104, and a downstream settling basin 12 is provided above ground on the downstream side of the drainage pump 1. A water level gauge 4 and a pressure gauge 5 are disposed in a suction sump 2 or the sewage-only channel 103a.

In this example, during maintenance operation the gate 6 in the drainage pump delivery side river 104 can be opened and water reverse-flow fed, and after a fixed period of no-discharge operation the speed can be increased to 100% or the vane angle increased to the design vane angle and drainage performed. As a result of the pump operation control described above, because river water flows with a head drop from the impeller of the pump into a sludge accumulation part, accumulated sludge can be mixed with the river water and in no-discharge operation as shown in FIG. 13 reverse flow 15 accompanying swirling occurring at the inlet of the impeller 1c agitates and disperses and makes uniform the concentration of the sludge 16 in the river water. As a result, during maintenance operation drainage, because sludge remaining in the underground waterway 103a can be discharged into the above-ground downstream settling basin 12, special sand-removing equipment and a settling basin in front of the pump (upstream) become unnecessary.

Figure 7:
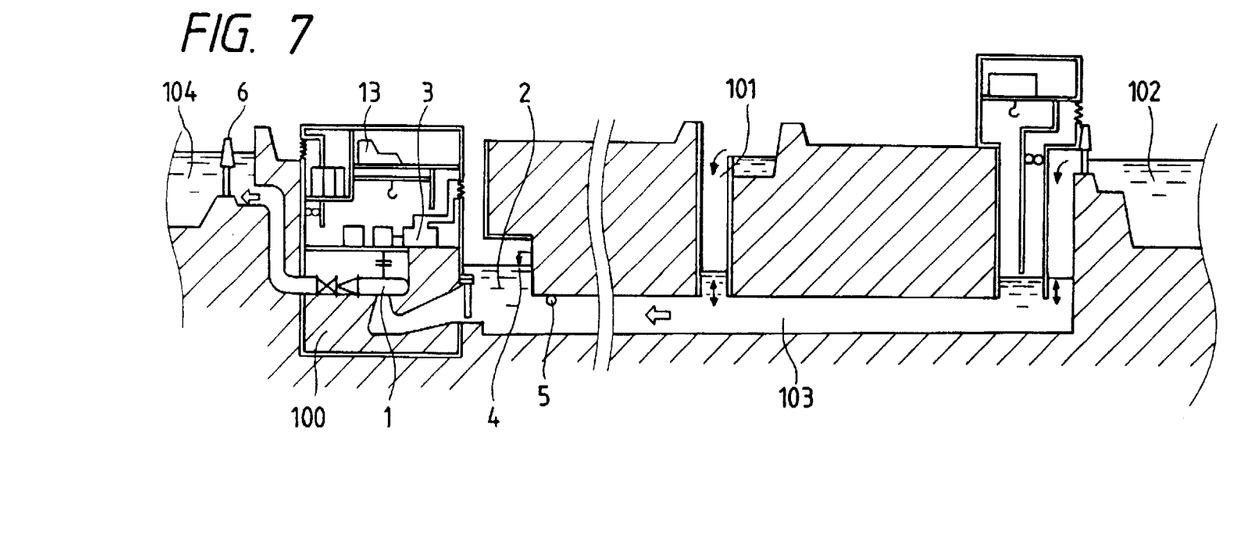
FIG. 7 is an overall vertical sectional view of an example of the invention applied to a drainage pump station wherein a feed channel is operated as a pressure channel.

FIG. 7 is an example of an underground pump station which passes rainwater through an underground waterway into a suction sump and then discharges it into a downstream-side river 104 with a pump. In this example also, a driving machine 3 has a capacity greater than the shaft power necessary for no-discharge operation of the pump. As a result, when the drainage pump 1 is installed deep underground where a feed channel 103 is operated as a pressure channel, even when as is conventional an axial flow pump or a mixed flow pump is used as the drainage pump, even when the operating point of the pump changes depending on the water level in the suction sump 103 it is not particularly necessary to carry out operating point control of the pump. Also, by making the drainage pump 1 a variable speed or adjustable vane pump, from water level data from the water level gauge 4 or the pressure gauge 5, operation control of the drainage pump 1 which keeps the water level in the suction sump 2 or the underground waterway 103 at a fixed value is possible.

Therefore, when it is anticipated that the inflow rate from upstream will fall and the pump will shift into partial discharge operation, the discharge is suppressed in advance by reducing the speed or the vane angle; when there is a danger of the inflow rate from upstream increasing and the pump station 100 being inundated, the discharge is increased in advance by increasing the speed or the vane angle; when standby operation is being carried out, frequent changes between dry-running operation and liquid phase operation can be prevented, and because even in the case of normal liquid phase operation it is possible to control the pump operating point so that it does not move away from near the design point, the operating reliability of the pump and the pump station can be increased.

By a rainfall inflow prediction system based on rainfall data from rainfall radar and a waterway flow simulation for analyzing water level changes in the upstream waterway 103 being built into a control panel 13 of the drainage pump station shown in FIG. 7, reliability can be further increased. That is, in FIG. 7, a water level gauge 4 or a pressure gauge 5 are provided in the suction sump 2 or the underground waterway 103, and the pump 1 is operated based on hour-by-hour and moment-by-moment water level change prediction results in waterway flow state simulation from this water level data and rainfall radar. As a result, advance prediction of inflow rate from upstream is also possible, and by carrying out operation control which takes into account from the present to a future state frequent operation control actions are eliminated and the danger of water level surging and the like in the upstream waterway 103 and the vertical shafts 101 accompanying operation control actions can be eliminated.

In the preferred embodiments described above the invention was described with reference to examples in which axial flow pumps were mainly used, but if they are high specific speed, mixed flow pumps can be applied in the same way; also, the same effects can be obtained with adjustable vane pumps of which the vane angle can be changed as well as with variable speed pumps.

As described in detail above, the invention has the following effects:

(1) Because the driving machine of the pump has a capacity greater than the shaft power necessary for no-discharge operation of the pump and in the case of a large rainfall greater than the design rainfall capacity of the pump station (severe flooding) the pump is operated at an overload exceeding the design discharge, overhead flooding inundation of the drainage pump station and drainage basins can be prevented even during severe flooding.

(2) Because during maintenance operation it is possible to check the functioning of the pump and the driving machine in an actually loaded state by feeding water into the station from a river on the delivery side of the pump station, highly reliable maintenance operation is possible. Also, because the pump is not dry-run during maintenance operation, it is possible to dispense with equipment for supplying water to the bearings and shaft seals of the pump. Furthermore, because during maintenance operation the feed channels is filled with water before being drained, it is possible to change the air simultaneously with the maintenance operation.

(3) In the case of a large rainwater inflow into an underground drainage station, by operating the pump at the necessary capacity, keeping the water level in an underground waterway above a rated value by lowering the pump capacity when the rainwater inflow has fallen, and increasing the pump discharge to a capacity at which sediment can be discharged when the rainwater inflow has become substantially zero, it is possible to discharge sediment inside the station at the same time as water remaining in the station is drained, and it is possible to prevent accumulation of sediment contained in the rainwater in the feed channel and the suction sump. Also, by providing a suction blower in the top of a suction sump and disposing interstage valves at the entrances of vertical shafts, and when draining remaining water from the underground waterway operating the suction blower and simultaneously opening the vertical shaft interstage valves sequentially from upstream, it is possible to change the air in the underground waterway during drainage and it is thereby possible to efficiently remove malodorous air from the underground waterway while discharging sludge.

(4) By making an underground station one which operates a feed channel as a pressure channel, making the pump a variable capacity pump and controlling it so that the water level in an underground waterway is constant, it is possible to reduce the frequency of starting and stopping of the pump and operate the pump highly reliably at all times irrespective of changes in rainwater inflow.

What is claimed is:

1. A drainage pump station for collecting rainwater in a waterway and discharging it, comprising:
   a variable capacity drainage pump which pumps said water from the waterway in order to discharge it from the pump station;
   a driving machine of the pump having a capacity greater than a shaft power of the pump necessary for operating the pump without discharging the water from the pump station; and
   a water level gauge or a pressure gauge disposed in a suction sump or waterway upstream of said pump, wherein
   when an inflow rate of water detected by said water level gauge or said pressure gauge exceeds the design capacity of the station, the pump is operated at an overload exceeding the design drainage discharge;
   whereby drainage operation is given priority over a life of said pump and said driving machine.

2. A drainage pump station according to claim 1 wherein the variable capacity drainage pump is a variable speed or adjustable vane mixed flow or axial flow pump.

3. A drainage pump station having a drainage pump for collecting rainwater in a waterway and discharging it, comprising:

a gate disposed in a drainage pump delivery side river part of the pump station; and an auto-screen disposed on the river side of the gate, wherein during maintenance operation the gate in the drainage pump delivery side river part is opened and water is reverse-flow fed into the underground waterway and an actual load is applied to the pump station to carry out operation checking.

4. A drainage pump station according to claim 3 wherein the drainage pump is of variable capacity and with respect to sudden rainfall during maintenance operation the pump capacity is increased and the pump is operated at an overload exceeding a design drainage discharge.

5. A drainage pump station according to claim 4 wherein the drainage pump is a variable speed or adjustable vane pump and with respect to sudden rainfall during maintenance operation the speed of the pump is increased or the vane angle is increased to operate the pump at an overload.

6. A drainage pump station according to claim 3 wherein a bearing or a shaft seal of the drainage pump is made of ceramics.

7. A drainage pump station for collecting rainwater in an underground waterway and discharging it into a large river comprising:

a drainage pump;

a gate disposed in a drainage pump delivery side river part of the pump station;

an auto-screen disposed in the river side of the gate; and a water level gauge or a pressure gauge disposed in the underground waterway or a suction sump, thereof, wherein during maintenance operation water is fed into the underground waterway as far as the top thereof as detected by said water level gauge or said pressure gauge from the delivery side river to carry out maintenance operation.

8. A drainage pump station according to claim 7, further comprising:

a rainfall inflow prediction system based on rainfall data from rainfall radar; and waterway flow simulation for analyzing water level changes in the underground waterway, wherein sudden rainfall during feeding of water into the underground waterway from the delivery side river is predicted in advance by the waterway flow simulation and judgment of whether or not maintenance operation is possible or changeover from water feeding to water discharge is carried out accordingly.

9. A drainage operating method for a drainage pump station for discharging rainwater having a variable capacity drainage pump, the method comprising the steps of:

using a rainfall inflow prediction system based on rainfall data from rainfall radar and a waterway flow simulation for analyzing water level changes in a waterway upstream of the drainage pump station to predict a water level of an upstream waterway;

when a change in the upstream waterway water level exceeds a pump station design value, making the capacity of the pump greater than its rated values and performing an overload operation exceeding the design discharge.

10. A drainage operating method for a drainage pump station for discharging rainwater into a large river having a variable capacity drainage pump, the method comprising the steps of:

reverse-flow feeding water from a drainage pump delivery side river part into the drainage pump station and carrying out maintenance operation of said pump and drainage station with an actual load applied;

using a rainfall inflow prediction system based on rainfall data from rainfall radar and a waterway flow simulation for analyzing water level changes in a waterway upstream of the drainage pump station to predict a water level of an upstream waterway; and predicting a sudden rainfall during a maintenance operation in advance by the waterway flow simulation and whether or not maintenance operation is possible or a maintenance operation load is decided accordingly.

11. A drainage operating method for a drainage pump station for passing rainwater through an underground waterway and discharging it into a downstream side river, the method comprising the steps of:

providing a variable capacity drainage pump and a water level gauge or a pressure gauge disposed in a suction sump or the underground waterway;

when data from the water level gauge or the pressure gauge indicates that an inflow rainwater discharge is decreasing, reducing the capacity of the pump and keeping the water level of the underground waterway above a fixed value;

when the capacity of the pump reaches a minimum rated value, closing the delivery side of the pump and carrying out a no-discharge operation of the pump; and when after change in the underground waterway water level is monitored for a fixed period until the change in the water level becomes substantially nil, increasing the drainage discharge of the pump to a capacity at which sediment in the underground waterway can be discharged, and discharging the remaining water.

12. A drainage operating method for a drainage pump station according to claim 11 wherein the drainage pump is a variable speed or adjustable vane mixed flow pump or axial flow pump, the method further comprising the step of changing the speed or the vane angle of the pump to control the capacity of the pump, and a capacity at which sediment can be discharged is a rated speed or a design vane angle.

13. A drainage operating method for a drainage pump station according to claim 11, the method further comprising the step of using a rainfall inflow prediction system based on rainfall data from rainfall radar and a waterway flow simulation for analyzing water level changes in an underground waterway to predict upstream water level changes and, when it is predicted that an inflow rate from upstream will increase cancelling a no-discharge operation or a low-speed operation of the pump.

14. A combined sewerage system drainage pump station for passing rainwater and sewage through an underground waterway into a suction sump and discharging it into a downstream side river with a drainage pump, comprising:

a variable capacity drainage pump;

a water level gauge or a pressure gauge disposed in a suction sump or the underground waterway;

a downstream settling basin disposed on the drainage pump delivery side; and a control apparatus which when data from the water level gauge or the pressure gauge indicates that an inflow rainwater discharge is decreasing reduces the capacity of the pump and keeps the water level of the underground waterway above a rated value, when the capacity of the pump reaches a minimum rated value closes the delivery side of the pump and conducts no-discharge operation of the pump, when after change in the underground waterway water level is monitored for a fixed period change in the water level becomes substantially nil increases the drainage discharge of the pump to a capacity at which sediment in the underground waterway can be discharged and discharges remaining water.

15. A combined sewerage system drainage pump station for passing rainwater and sewage through an underground waterway into a suction sump and discharging it into a downstream side river with a drainage pump, comprising:

a suction blower disposed at the top of the suction sump; and interstage valves disposed at the entrances of vertical shafts, wherein the suction blower disposed at the top of the suction sump is operated and the interstage valves are sequentially opened from upstream and the underground waterway is thereby ventilated.

16. A drainage pump station according to claim 15, further comprising:

a variable speed or adjustable vane drainage pump;

a water level gauge or a pressure gauge disposed in the suction sump or the underground waterway; and a control apparatus which when data from the water level gauge or the pressure gauge indicates that an inflow rainwater discharge is decreasing reduces the speed or the vane angle of the pump and keeps the water level of the underground waterway above a fixed value, when the speed or the vane angle of the pump reaches a minimum rated value closes the delivery side of the pump and conducts no-discharge operation of the pump and closes the interstage valves in the vertical shafts, when after change in the underground waterway water level is monitored for a fixed period change in the water level becomes substantially nil brings the pump to a rated speed or a design vane angle and discharges water remaining in the underground waterway.

17. A drainage pump station according to claim 16, further comprising:

a driving machine of the pump having a capacity greater than a shaft power necessary for no-discharge operation of the pump;

a gate disposed in a drainage pump delivery side river part and having an auto-screen disposed on the river side thereof;

a downstream settling basin disposed above ground on the drainage pump delivery side upstream of the gate; and a control apparatus which during maintenance operation opens the gate in the drainage pump delivery side river part and feeds water in reverse-flow, after a fixed period of no-discharge operation brings the pump to a rated speed or a design vane angle and conducts drainage operation.

18. A drainage pump station for passing rainwater through an underground waterway into a suction sump and during pump operation operating the underground waterway as a pressure channel at all times and discharging the rainwater into a downstream side river, the improvement in the pump station including:

a pump driving machine having a capacity greater than a shaft power of the pump necessary for operating the pump without discharging the water from the pump station.

19. A drainage pump station according to claim 18 wherein the drainage pump is a variable speed or adjustable vane pump, further comprising:

a water level gauge or a pressure gauge disposed in the suction sump or the underground waterway; and a control apparatus for controlling the operation of the pump so that the water level in the underground waterway is constant.

20. A drainage pump station according to claim 19 wherein the control apparatus uses a rainfall inflow prediction system based on rainfall data from rainfall radar and a waterway flow simulation for analyzing water level changes in the underground waterway to predict a water level in the underground waterway and controls the pump so that the water level in the underground waterway is constant.

* * * * *